United States Patent [19]
Kamiguchi et al.

[11] Patent Number: 5,736,079
[45] Date of Patent: Apr. 7, 1998

[54] METHOD OF CONTROLLING AN EJECTOR OF AN INJECTION MOLDING MACHINE

[75] Inventors: Masao Kamiguchi; Yuichi Hosoya, both of Minamitsuru-gun; Minoru Kobayashi, Oshino-mura, all of Japan

[73] Assignee: Fanuc Ltd., Minamitsuru-gun, Japan

[21] Appl. No.: 648,140

[22] PCT Filed: Oct. 20, 1995

[86] PCT No.: PCT/JP95/02166

§ 371 Date: May 21, 1996

§ 102(e) Date: May 21, 1996

[87] PCT Pub. No.: WO96/13369

PCT Pub. Date: May 9, 1996

[30] Foreign Application Priority Data

Oct. 26, 1994 [JP] Japan ................................ 6-286011

[51] Int. Cl.⁶ .................................................. B29C 45/40
[52] U.S. Cl. ........................ 264/40.1; 264/334; 425/139; 425/556
[58] Field of Search .................... 264/40.1, 69, 334; 425/139, 444, 556

[56] References Cited

U.S. PATENT DOCUMENTS 5,405,259  4/1995  Morikita ................................. 425/556
5,439,371  8/1995  Sawaya ................................... 425/556
5,472,335  12/1995 Morikita ................................. 425/556

FOREIGN PATENT DOCUMENTS

| 5919983 | 4/1994 | European Pat. Off. | ........... 425/139 |
| 62-117720 | 5/1987 | Japan | .................. 425/139 |
| 1-308613 | 12/1989 | Japan . | |
| 4-133711 | 5/1992 | Japan | .................. 425/139 |
| 4-305423 | 10/1992 | Japan . | |
| 6-114897 | 4/1994 | Japan . | |
| 07009506 A | 1/1995 | Japan . | |

*Primary Examiner*—James P. Mackey
*Attorney, Agent, or Firm*—Staas & Halsey

[57] ABSTRACT

An ejector mechanism is driven by a servomotor. An ejector pin in the ejector mechanism is made to perform a motion such that the ejector pin reaches a predetermined protrusion limit position beyond a position where the removal of a molded product from a cavity or core is completed after making a check for positioning, and a plurality of cycles of reciprocating motion of a short amplitude such that the ejector pin neither retracts beyond a position where the removal of the molded product from the cavity or core is started nor protrudes to the protrusion limit position, without requiring a check for positioning.

5 Claims, 4 Drawing Sheets

FIG. 3B

METHOD OF CONTROLLING AN EJECTOR OF AN INJECTION MOLDING MACHINE

TECHNICAL FIELD

The present invention relates to an improvement of a method in which a molded product, which remains in a cavity or a core of a mold after being injection-molded by an injection molding machine, is released from the cavity or the core to be dropped outside by protruding an ejector pin to the cavity or the core.

BACKGROUND ART

In a known ejector apparatus, a molded product, which is difficult to be released from a mold, is forcedly released or unmolded from a movable mold by repeatedly executing the protruding motion of an ejector pin. In the conventional ejector apparatus, however, a reciprocating motion in which the ejector pin is protruded from an unmolding start position to a given protrusion completion position and is returned again to the unmold start position is simply repeated. Therefore, the ejector apparatus of this type has a disadvantage such that if the number of repetitions of protruding motion is increased to perform a reliable unmolding operation, the cycle time of the molding operation increases.

Especially when the molded product sticks to the ejector pin itself, it is necessary to repeatedly execute such a protruding motion, resulting in a marked increase in cycle time. In many of the conventional ejector apparatuses, the return position of an ejector rod is set at a position further behind the end face of an ejector plate from which the ejector pin is erected, so that in many instances a delay in motion is often caused by a useless increase in motion stroke of the ejector rod. When the molded product, sticking strongly to the ejector pin, is not removed from the mold by single protruding motion, the ejector pin is strongly pushed out at every protruding motion to give an impact force to the molded product. This gives rise to a problem such that a tear is produced on the molded product or the ejector pin runs through the molded product, producing deformation.

Unexamined Japanese Patent Publication No. 59-42941 discloses an ejector apparatus in which a plurality of cycles of protruding motion are executed in a short period of time by starting the next protruding motion of the ejector pin before completely returning the ejector pin to the unmold start position after the protrusion of the ejector pin has been completed. In the ejector apparatus of this type, only the ejector pin protrusion start position in the second and subsequent cycles of reciprocating motion can be changed, and the ejector pin protrusion completion position is always constant in any cycle of protruding motion. Therefore, this gives rise to a problem such that the unmolding operation according to the unmold property of molded product cannot be performed. Also, a plurality of mechanical detection switches for detecting the position of the ejector pin are arranged to check the return position and the protrusion completion position of the ejector pin, so that the construction of the ejector apparatus becomes complex. Thus, the return position and the protrusion completion position of the ejector pin cannot be changed (the installation positions of the detection switches cannot be changed either) while the protruding motion are repeated continuously. That is to say, as described above, the ejector apparatus invites a problem such that an unmolding operation according to the unmold property of the molded product cannot be performed. Further, a reversal motion is carried out by detecting the return position and the protrusion completion position of the ejector pin by means of the detection switches. Therefore, the motion is delayed by the time required for the detecting operation, causing an increase in cycle time.

To reliably perform the unmolding operation of the molded product, an air ejector is sometimes used in combination with the ejector pin for the unmolding operation. However, the air ejector is used only to prevent the unmolded piece from being hindered from dropping by riding on the protruding portion of the mold or by sticking to the mold due to static electricity, unmolding agent, etc. Thus, the air ejector will not produce any effect unless the molded piece is separated completely from the movable mold during the unmolding operation and is not capable of removing the molded piece from the movable mold as long as the molded piece remains sticking hard to the mold.

Unexamined Japanese Patent Publication No. 6-114897 and Unexamined Japanese Patent Publication No. 6-170897 disclose a method for effectively dropping the molded product from the mold by making the ejector pin exert both protruding motion and fine vibration (or swinging motion). However, for the minute vibration or the swinging motion, advancing is performed by a hydraulic cylinder and retreating is performed by the restoring force of a return spring, so that the distance of advance and the distance of retreat are equal to each other, and either of the retreat limit or the advance limit in minute vibration is always the minute vibration start position (a dropping position where the molded product drops surely or a protruding start position). With this method, therefore, only an extremely limited kind of motion can be given to the ejector pin. Therefore, according to these prior art, it is difficult to produce an ejector motion of a kind most suitable to the dropping of the molded product.

DISCLOSURE OF THE INVENTION

An object of the present invention is to eliminate the above disadvantages of the prior art, and to provide an ejector control method for an injection molding machine, in which unmolding of a molded product can reliably be performed without causing deformation of the molded product even when the molded product sticks hard to a movable mold or an ejector pin.

In order to achieve the above object of the present invention, an ejector mechanism is driven by a servomotor, whereby an ejector pin in the ejector mechanism is given a motion such that the ejector pin reaches a predetermined protrusion limit position beyond a position where the removal of a molded product from a cavity or core is completed while performing positioning confirmation, and a plurality of cycles of motion of a short amplitude such that the ejector pin neither retracts beyond a position where the removal of the molded product from the cavity or core is started nor protrudes to the protrusion limit position without any positioning confirmation.

In the ejector control method according to a first mode of the present invention, the ejector pin is first protruded at a predetermined speed from a predetermined retracted position to the predetermined protrusion limit position by one protruding operation, and the plural cycles of reciprocating motion of the ejector are then started from the protrusion limit position.

As a result, an unmolding operation can be performed by using the core or cavity of a movable mold in place of a stripper plate, and a reliable unmolding operation can be performed even when the molded product sticks to the ejector pin. In this case, since the protrusion limit of the ejector pin during vibration is the predetermined protrusion limit position, there is no wasteful motion of ejector pin, and the unmolding operation can be performed in a short period of time. Also, since the unmolding operation is performed by the vibration of ejector pin, any large inertia will not act on the molded product unlike the case where the unmolding operation is performed at a stretch by making the ejector pin perform a protruding motion of full stroke, and a problem such that the removed molded product is scattered inadvertently can be solved.

In the ejector control method according to a second mode of the present invention, the ejector pin is first protruded from a predetermined retracted position to a position slightly beyond a position where the removal of the molded product from the cavity or core is started by one protruding operation, and a plurality of cycles of reciprocating motion of the ejector are then performed from the protrusion position so that the protrusion distance is larger than the retraction distance, and the ejector reaches the predetermined protrusion limit position by the final advance motion in the reciprocating motion.

As a result, even when the draft is insufficient, and the molded product sticks hard to the ejector pin at all stages from the start of mold release to the completion of mold release, the unmolding operation can be performed without producing deformation such as tear and penetration of ejector pin.

Also, according to the present invention, a servomotor is used as a driving source, and an ejector rod is vibrated in a manner such that the unmold start position is the ejector pin retraction limit, so that the ejector rod does not move wastefully, and a high-speed vibration of ejector pin can be achieved. Further, by conducting a positioning confirmation for the movement command to the servomotor unexecuted, a delay caused by the operation for checking the positioning is eliminated, so that the speed of the ejector pin vibrating motion is further increased. Thus, the cycle time can be shortened accordingly, and a reliable unmolding operation in which deformation of molded product is prevented can be performed by more minute vibration.

BEST MODE FOR CARRYING OUT THE INVENTION

Figure 1A:
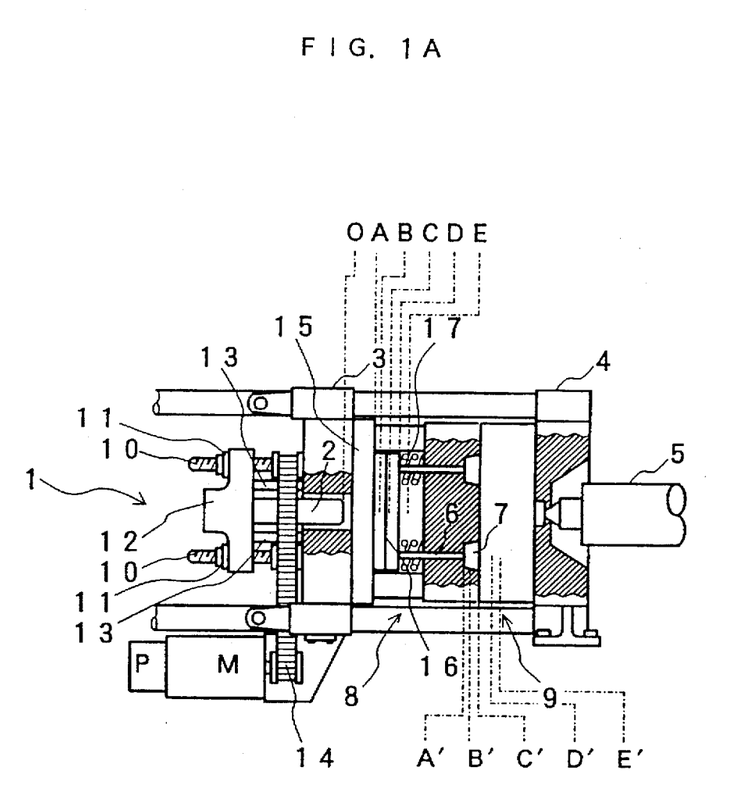
FIG. 1A is a schematic view of an ejector mechanism and the surroundings thereof in a motor-driven injection molding machine to which the method of the present invention is applied.

In an injection molding machine, as shown in FIG. 1A, a moving platen 3 moves towards or away from a stationary platen 4 under the control of a servomotor (not shown). A movable mold 8 and a fixed mold 9 are attached to the moving platen 3 and the stationary platen 4, respectively. In FIG. 1A, reference numeral 7 denotes a product molded by injecting resin from an injection cylinder 5 into a cavity formed in the movable mold 8.

An ejector mechanism 1 on the injection molding machine comprises ball threads 10, 10 attached rotatably to the back face (a face opposite to the face on which the movable mold 8 is attached) of the moving platen 3 of the injection molding machine, a pusher plate 12 provided, at the center thereof, with an ejector rod 2 passing through the moving platen 3, guide rods 13, 13 for guiding the pusher plate 12 in such a manner as to move towards or away from the moving platen 3, a servomotor M for ejector, which rotates the ball thread 10, 10, a timing belt 14, etc.

At both sides of the pusher plate 12, ball nuts 11, 11, which are screwed onto the ball threads 10, 10, are integrally fixed. By driving the servomotor M to rotate the ball threads 10, 10, the pusher plate 12 is moved along the guide rods 13, 13, causing the ejector rod 2 to be protruded from the surface (the surface to which the movable mold 8 is attached) of the moving platen 3, or retracted therefrom.

The ejector rod 2 protruding from the surface of the moving platen 3 further passes through a through hole formed in an attaching plate 15 of the movable mold 8, pushes an ejector plate 16 of the movable mold 8 against the elastic force of return springs 17, and pushes molded products 7 by using the tip ends of ejector pins 6 provided integrally on the ejector plate 16, whereby the molded products 7 are removed from the core of the movable mold 8, in performing unmolding operation.

FIG. 1A shows a state in which the injection molding machine has completed injection (the mold is being clamped). The unmolding operation is not performed in this state, but is performed in a state in which the moving platen 3 moves away from the stationary platen 4, and the movable mold 8 and the fixed mold 9 are open.

As described above, the construction itself of the ejector mechanism 1 is completely the same as that of the conventional motor-driven injection molding machine.

Figure 1B:
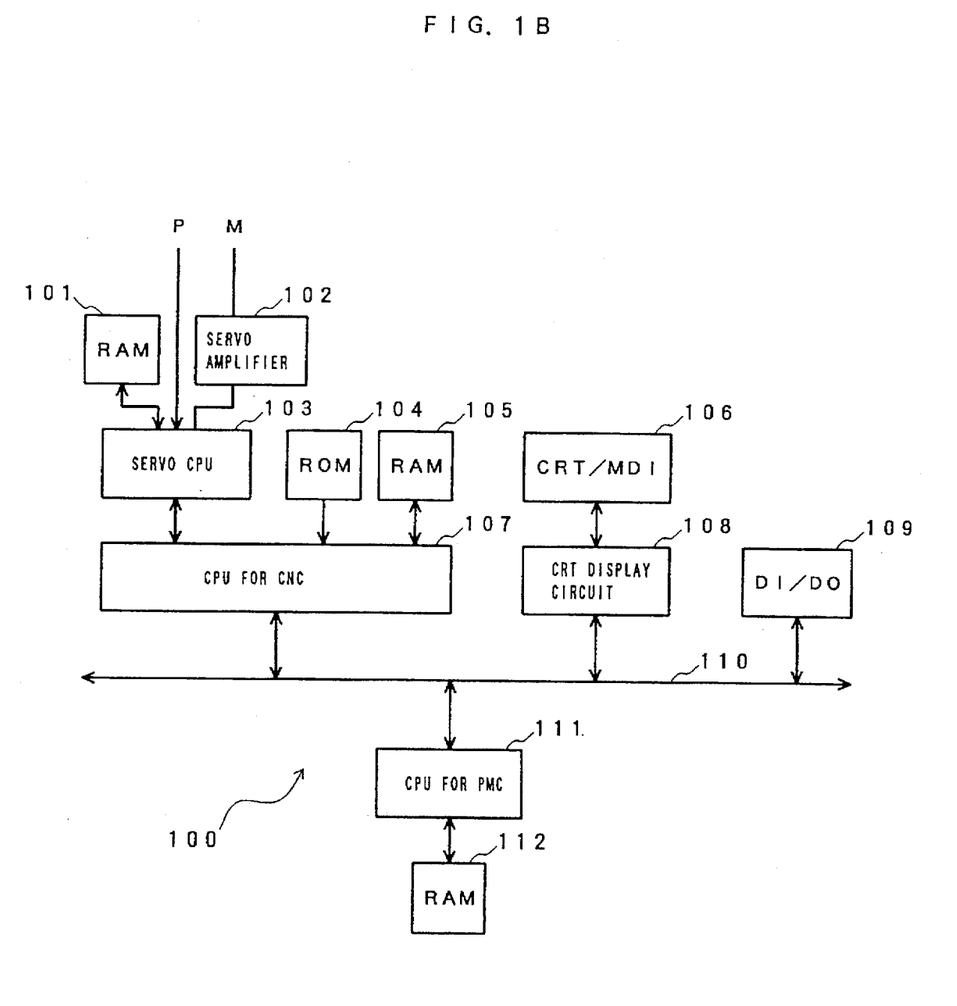
FIG. 1B is a functional block diagram showing the outline of a principal part of a control unit for controlling the motor-driven injection molding machine shown in FIG. 1A.

As shown in FIG. 1B, a control unit 100 for controlling the injection molding machine, including a CPU for CNC 107, which is a microprocessor for numerical control, a microprocessor for programmable machine controller (hereinafter referred to as a CPU for PMC) 111, and a microprocessor for servo control (hereinafter referred to as a servo CPU) 103, and is designed to transmit information between microprocessors by selecting mutual input/output via a bus 110.

The CPU for PMC 111 stores a sequence program for controlling the sequence motion of the injection molding machine, and the like, and is connected to a nonvolatile RAM 112 used for the temporary storage of arithmetic data. Connected to the CPU for CNC 107 are ROM 104 storing control software for controlling each axis of the injection molding machine and the like and a RAM 105 used for the temporary storage of arithmetic data. The RAM 105, which is a nonvolatile reloadable memory, stores various molding conditions and setting values, parameters, macro variables, etc. as well as a movement command program for controlling the drive of the ejector mechanism 1 (hereinafter simply referred to as a movement command program).

Connected to the servo CPU 103 is a nonvolatile RAM 101 used for the preservation of programs for servo control and the temporary storage of data, and servo amplifiers for driving a servomotor of each axis for ejector, for mold closing, for screw rotation, for injection, etc. based on the command from the CPU 103 (In FIG. 1B, only a servo amplifier 102 for a servomotor M for ejector is shown, and other servo amplifiers are omitted). A signal from a pulse coder P provided on the servomotor M for ejector is fed back to the servo CPU 103, whereby the current rotational position of the servomotor M for ejector, calculated on the basis of the feedback pulse of the pulse coder P, that is, the current position of the ejector rod 2 is checked by the CPU for CNC 107.

An input-output circuit 109 is an input-output interface for receiving signals from limit switches disposed at various positions of the injection molding machine or a control panel, or for transmitting various commands to peripheral devices and the like of the injection molding machine.

A manual data input device 106 with display, being connected to the bus 110 via a CRT display circuit 108, is used to perform the selection of function menu, input operation of various data, and the like. It is provided with ten keys for inputting numerical data and various function keys. The movement command program stored in the RAM 105 can be rewritten for the convenience of user by the manual data input device with display 106.

By the above-described configuration, CPU for CNC 107 performs pulse distribution for the servomotors of the axes based on the control program of the ROM 104 and the data such as molding conditions of the RAM 105. On the other hand, the servo CPU 103 executes so-called digital servo processing by executing the servo control such as position loop control, speed loop control, current loop control, as in the case of the conventional injection molding machine, based on the pulse-distributed movement command to each axis and the feedback signals for the position and speed detected by a pulse coder of each axis.

Figure 2:
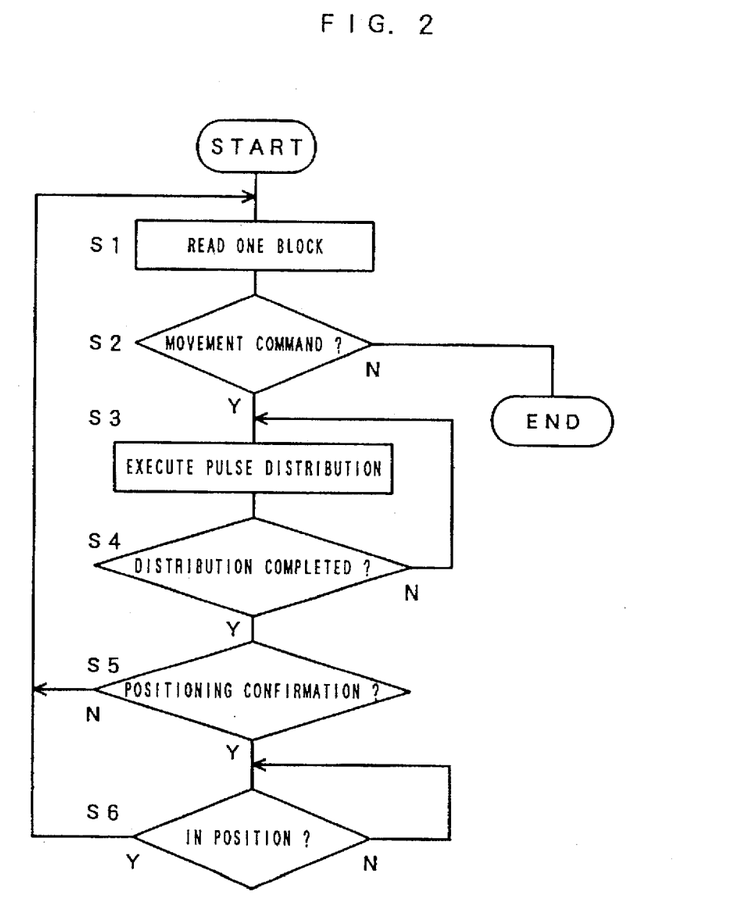
FIG. 2 is a flowchart showing the outline of control software for ejector stored in the control unit in accordance with this embodiment.

FIG. 2 is a flowchart showing the outline of control software, for an ejector, stored in the ROM 104 to execute the movement command program. This processing is sequentially executed by the CPU for CNC 107 on receipt of the ejector operation command from the CPU for PMC 111 which carries out sequence control of the whole.

The CPU for CNC 107, which starts the execution of movement command program based on the control software for ejector on receipt of the ejector operation command from the CPU for PMC 111, first reads the first one block from the movement command program (Step S1), and determines whether or not this one block relates to the movement command (Step S2). If this one block relates to the movement command, pulse distribution is executed based on the movement command of this one block, the movement distance, and preset movement speed, the servomotor M for ejector is driven through the servo CPU 103 and the servo amplifier 102, and the ejector pins 6 are moved by operating the ejector mechanism 1 (Step S3). After the distribution is completed (Step S4), it is determined whether or not positioning confirmation is necessary (Step S5). If check of positioning confirmation is commanded for that block, the mechanism waits until the positioning is completed, that is, until the difference between the position command and the actual position (positional difference) comes within a predetermined value range (Step S6). If a command requiring to ignore positioning is present, the processing moves to the Step S1 immediately after the completion of distribution.

Subsequently, the CPU for CNC 107 repeatedly reads the next one block and repeatedly executes the same processing as described above. Finally, when the end command is read from the movement command program, all processing for unmolding operation is completed, and an ejector operation completion signal is outputted to the CPU for PMC 111.

Next, the operation of the ejector mechanism 1 in accordance with a first embodiment will be described with reference to FIG. 1A.

In the unmolding operation according to this embodiment, the tip of the ejector pin 6 is first protruded to a protrusion completion position E' beyond an unmolding completion position C'. Next, the retreat limit of the ejector pin 6 is set at an unmolding start position A' or a position B' between the unmold start position A' and the unmold completion position C', and a vibrating operation is performed with the protrusion limit being a position D' between the unmold completion position C' and the protrusion completion position E'.

Figure 3A:
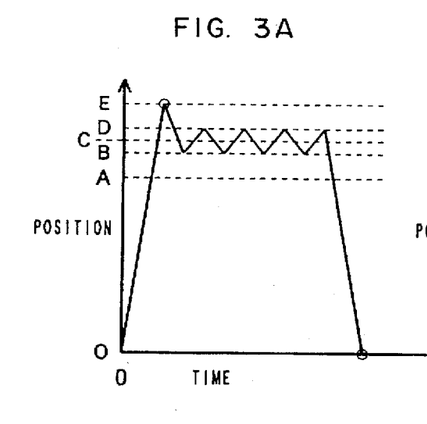
FIGS. 3A and 3B are timing charts showing examples of ejector pin motion.

This embodiment, which enables the removal of the molded product 7 from the movable mold 8, is effective when the molded product 7 sticks hard to the tip of the ejector pin 6. The tip positions A, B, C, D, and E of the ejector rod 2 corresponding to the tip positions A', B', C', D', and E' of the ejector pin 6, respectively, are shown in FIG. 1A. The operation times of the ejector rod 2 corresponding to the unmolding operation by the movement command program in this embodiment is shown in FIG. 3(a).

A tip position O shown in FIG. 1A is one example of a set original position for return of the ejector rod 2. The set original position for return of the ejector rod 2 can be set at any position on the retraction side from the position A where the tip of the ejector rod 2 abuts on the ejector plate 16. Generally, after the movable mold 8 is installed by returning the tip of the ejector rod 2 to the position O (on the retraction side from the surface of the moving platen 3) as shown in FIG. 1A, the ejector rod 2 is once protruded to detect the position A where the tip thereof abuts on the ejector plate 16, and then retracted slightly from this position to set the once-set original position O for return again, by which a loss of operation time caused by a wasteful movement of the ejector rod 2 is prevented. At the same time, the return of the ejector plate 16 to the original position is made by the return springs 17. Needless to say, if such setting is performed, the set original position O for return will coincide substantially with the position A.

When the movement command program is executed by the ejector control software, high-speed processing is performed omitting positioning confirmation for the vibrating operation of the ejector pin 6 between the position B' and the position D', and sure positioning is performed by checking the positioning for the first protruding operation of the ejector pin 6 to the position E' beyond the unmold completion position C' and for the returning operation to the set original position O for return of the ejector rod 2. The point where the check for positioning is executed is indicated with a small circle marks in FIG. 3A. FIG. 3A shows the operation time of the ejector rod 2, and does not show the operation time of the ejector pin 6 itself. However, the operation time of the ejector pin 6 is completely the same as the operation time of the ejector rod 2 in the interval between the position A and the position E in FIG. 3A. The retraction limit of the ejector pin 6 during vibration may be the unmolding start position A'. But, in effect, when the ejector pin 6 is retracted, the molded product 7 has to be caught by the corner of the core or cavity (cavity in the example of FIG. 1A) of the movable mold 8 in place of a stripper plate. Thus, by setting the retraction limit to the position B' on the protrusion side from the unmold start position A', the vibration stroke of the ejector pin 6 can be shortened, so that unmolding operation can be performed at a higher speed. Since the vibration stroke of the ejector pin 6 is short, an inertia acting on the molded product 7 when the molded product 7 is finally released from the ejector pin 6 can be reduced, whereby the problem such that the molded products 7 are scattered around to hinder the molded products 7 from being collected efficiently is overcome.

Next, the operation of the ejector mechanism 1 in accordance with a second embodiment will be described with reference to FIG. 1A.

First, the tip of the ejector pin 6 protrudes to the unmold start position A' or the position B' which is slightly beyond that position. Then, the ejector pin 6 protrudes to the protrusion completion position E' while vibrating in a manner such that the protrusion distance is larger than the retraction distance.

Figure 3B:
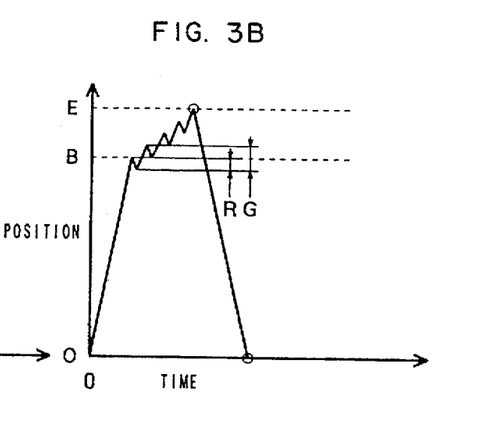

The operation time of the ejector rod 2 corresponding to the unmolding operation of the movement command program in this embodiment is shown in FIG. 3B. In FIG. 3B, R and G indicate the retraction distance and protrusion distance of the ejector pin 6, respectively. The values of the protrusion distance to be increased by one vibration cycle (G−R), and the protrusion distance G and the retraction distance R in one vibration cycle are determined in advance appropriately according to the number of vibration cycles between the position B' and the unmold completion position E' in FIG. 1A.

This operation is especially effective when the draft is insufficient, and the molded product sticks hard to the ejector pin at all stages from the start of mold release to the completion of mold release for the movable mold 8.

Thus, if the movement command program shown in FIG. 3(b) is executed based on the ejector control software shown in FIG. 2, high-speed processing can be performed by omitting positioning confirmation for the vibrating operation of the ejector pin 6 to be carried out between the position B' and the position E'. On the other hand, for the final protruding operation of the ejector pin 6 to the position E' and the returning operation of the ejector rod 2 to the set original position O for return, indicated by a small circle mark in FIG. 3(b), reliable positioning is performed by the check for positioning.

The operation time of the ejector pin 6 is completely the same as the operation time of the ejector rod 2 in the interval between the position B and the position E in FIG. 3B. In this case as well, an inertia acting on the molded product T when the molded product 7 is finally removed from the ejector pin 6 is small, so that the molded products 7 can be prevented from scattering around.

Two examples of operation of an ejector mechanism have been described above. In either case, the retraction limit of the ejector rod 2 is set so that the ejector rod 2 will not retract beyond the position A of the ejector rod 2 corresponding to the unmolding start position A' of the ejector pin 6 during the vibration the ejector pin 6, so that the tip of the ejector rod 2 will never be separated from the ejector plate 16. Therefore, useless independent movement of the ejector rod 2, which will not accompany the operation of the ejector pin 6, is eliminated, whereby high-speed processing resulting from the omission of positioning confirmation, as well as high-speed vibration of the ejector pin 6, can be achieved.

Further, if a movement command program for controlling the ejector mechanism 1 is prepared as occasion arises, various unmolding operations can be performed according to the unmold characteristics of the molded product 7 in addition to the above two examples. For example, after the tip of the ejector pin 6 is protruded to the unmold start position A', it may be protruded further to the unmold completion position C' while gradually increasing the amount of protrusion, and finally the tip can be protruded with one rush to the position E' beyond the unmold completion position C'. Alternatively, in the example of FIG. 3A, an unmolding operation may be performed by gradually decreasing the vibration amplitude in the second vibration cycle and after.

This is because the servomotor M for ejector is controlled by the CPU for CNC 107 based on the control software in the ROM 104 and the movement command program in the RAM 105. In a conventional injection molding machine, in which a plurality of mechanical detection switches for detecting positions are arranged on the ejector rod 2 to control the protruding position of the ejector pin 6, needless to say, the control of the operation as shown in FIG. 3(b), in which the protruding position of the ejector pin 6 undergoes a change during a series of vibrating operations, cannot be carried out.

As described already, in the configuration of this embodiment, the movement command program in the RAM 105 can be rewritten arbitrarily by operating the manual data input device with display 106. Therefore, the user can arbitrarily devise an ejector operation for unmolding operation depending on the characteristics of molded product, and can make the ejector device perform the ejector operation.

The user can give the control unit 100 an automatic programming function for automatically preparing the movement command program as described above by selecting an operation pattern as shown in FIG. 3A or FIG. 3B and by inputting the data such as the set original position O for return of the ejector rod 2, the positions A, B, C, D, and E, the amplitude (D−B), and the protrusion distance G and retraction distance R in vibration, in order that the movement command program for a desired ejector operation can be prepared automatically by referring to the interactive screen of the manual data input device with display 106. By doing so, a device which is more convenient for the user can be provided.

Also, a movement command program for executing a single or plural operation patterns, for example, one or both of the operation patterns shown in FIGS. 3A and 3B may be written in advance in ROM 104 by the manufacturer, and the user is required only to set the data such as the positions A, B, C, D, and E, the protrusion distance G, and the retraction distance R according to the sizes of the portions of the movable mold 8 and the molded product, so that an ejector operation is performed by referring to these data when the movement command program is executed.

In the injection molding machine having the servomotor M for ejector and the control unit 100, the modification or addition of hardware is not needed at all in applying the present invention, so that the increase in manufacturing cost due to the addition of new functions is held to a minimum.

We claim:

1. An ejector control method for an injection molding machine, in which the operation of an ejector mechanism driven by a servomotor is controlled according to a movement command program, by which a molded product remaining in a cavity or core of a movable mold fixed to a movable platen is removed from said cavity or core and dropped by protruding an ejector pin in said cavity or core, said method comprising the steps of:

making said ejector pin reach a predetermined protrusion limit position beyond a position where the removal of said molded product from said cavity or core is to be completed, by conducting positioning confirmation; and making said ejector pin perform a plurality of cycles of reciprocating motion of a short amplitude, without any positioning confirmation, so that said ejector pin neither retracts beyond a position where the removal of said molded product from said cavity or core is started nor protrudes to said protrusion limit position.

2. An ejector control method for an injection molding machine according to claim 1, wherein said ejector pin is first protruded at a predetermined speed from a predetermined retraction position to said predetermined protrusion limit position by one protruding operation; and said plural cycles of reciprocating motion of said ejector pin are then started from said protrusion limit position.

3. An ejector control method for an injection molding machine according to claim 1, wherein the amplitude of said reciprocating motion is decreased gradually.

4. An ejector control method for an injection molding machine according to claim 1, wherein said ejector pin is first protruded from a predetermined retraction position to a protrusion position slightly beyond said position where the removal of said molded product from said cavity or core is started, by a single protruding operation; and said plurality of cycles of reciprocating motion of said ejector pin are then performed from the protrusion position so that a protrusion distance is larger than a retraction distance of said ejector pin, and said ejector pin reaches said predetermined protrusion limit position by a final advance motion in said reciprocating motion.

5. An ejector control method for an injection molding machine according to claim 1, wherein the positioning confirmation to confirm that said ejector pin has reached said predetermined protrusion limit position is conducted by checking that the difference between a position command for giving a command to a control unit controlling said servomotor and the actual position of said servomotor is within a predetermined range.

* * * * *

UNITED STATES PATENT AND TRADEMARK OFFICE
CERTIFICATE OF CORRECTION

PATENT NO. : 5,736,079
DATED : April 7, 1998
INVENTOR(S) : Kamiguchi et al.

It is certified that error appears in the above-identified patent and that said Letters Patent is hereby corrected as shown below:

Title Page [75] line 2, change "Minamitsuru-gun" to --Yamanashi--;

line 3, change "Oshino-mura" to --Yamanashi--;

[73] line 1, change "Minamitsuru-gun" to --Yamanashi--.

Col. 7, line 40, change "T" to --7--.

Signed and Sealed this

Thirtieth Day of June, 1998

BRUCE LEHMAN

Attest:

Attesting Officer

Commissioner of Patents and Trademarks